United States Patent

Ishikawa

[11] Patent Number: 5,861,867
[45] Date of Patent: Jan. 19, 1999

[54] POINTING APPARATUS

[75] Inventor: Fujie Ishikawa, Kawaguchi, Japan

[73] Assignee: Kabushiki Kaisha Toshiba, Kawasaki, Japan

[21] Appl. No.: 258,373

[22] Filed: Jun. 10, 1994

Related U.S. Application Data

[63] Continuation-in-part of Ser. No. 71,110, Jun. 4, 1993, abandoned.

[30] Foreign Application Priority Data

Jun. 8, 1992 [JP] Japan ................................. 4-147323

[51] Int. Cl.$^6$ ....................................................... G09G 5/08
[52] U.S. Cl. ............................ 345/145; 345/157; 345/139
[58] Field of Search .................................... 345/157, 156, 345/160, 161, 162, 163, 168, 173, 145, 146, 150, 154, 139, 419

[56] References Cited

U.S. PATENT DOCUMENTS

| | | | |
|---|---|---|---|
| 4,661,810 | 4/1987 | Himelstein et al. | 345/145 |
| 4,668,947 | 5/1987 | Clarke, Jr. et al. | 345/145 |
| 4,683,468 | 7/1987 | Himelstein et al. | 345/163 |
| 4,698,625 | 10/1987 | McCaskill et al. | 345/157 |
| 4,808,979 | 2/1989 | DeHoff . | |
| 4,835,526 | 5/1989 | Ishii et al. | 345/145 |
| 4,987,527 | 1/1991 | Hamada et al. | 345/157 |
| 5,162,779 | 11/1992 | Lumelsky et al. | 345/145 |
| 5,270,688 | 12/1993 | Dawson et al. | 345/145 |

*Primary Examiner*—Xiao Wu
*Attorney, Agent, or Firm*—Banner & Witcoff

[57] ABSTRACT

When an indicating area in a three-dimensional space is entered from an input unit, an indicating area-object distance determination unit determines the distance between the indicating area and an object in the three-dimensional space on the basis of the coordinates of the indicating area and the representative coordinates of the object, which are stored in an object coordinates memory unit. A color parameter is read out from a display color memory unit in accordance with the determined distance, and the numeric value of a saturation, i.e., one of the color attributes of the object, which are stored in an object color memory unit, is rewritten with the readout color parameter. The rewritten numeric value of the saturation, together with object shape data from an object shape memory unit and object coordinate data from the object coordinates memory unit, is applied to an object display data generating unit, thereby generating object display data. This object display data is displayed on a display unit by a display control unit.

9 Claims, 6 Drawing Sheets

| OBJECT NAME | REPRESENTATIVE COORDINATES |
|---|---|
| A | (Xa,Ya,Za) |
| B | (Xb,Yb,Zb) |
| C | (Xc,Yc,Zc) |
FIG. 2
| DISTANCE D | COLOR PARAMETER |
|---|---|
| 0 ~ 10 | 1.0 |
| 11 ~ 30 | 0.8 |
| 31 ~ 60 | 0.7 |
| 61 ~ 100 | 0.6 |
| 101 ~ 150 | 0.5 |
FIG. 3
| OBJECT NAME | HUE (H) | VALUE (V) | SATURATION (S) |
|---|---|---|---|
| A | 60 | 0.9 | 0.5 |
| B | 180 | 0.5 | 0.7 |
| C | 200 | 0.7 | 0.8 |
FIG. 4
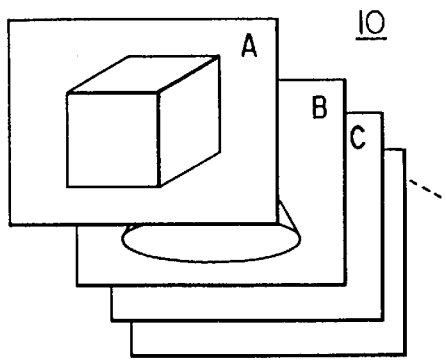
FIG. 5
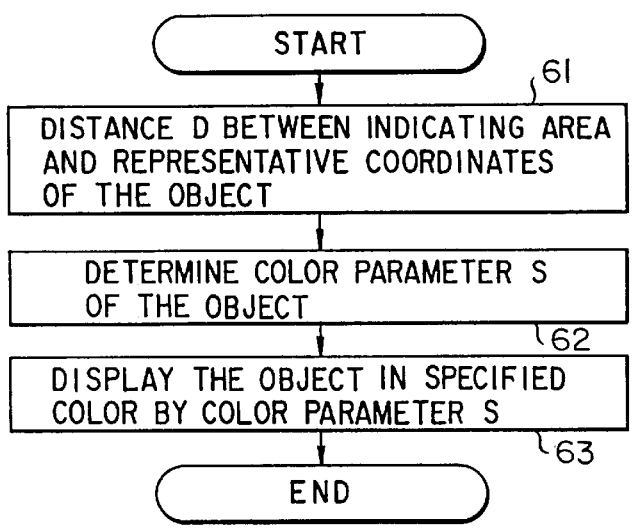
FIG. 6

POINTING APPARATUS

This application is a continuation-in-part of application Ser. No. 08/071,110, filed Jun. 4, 1993, now abandoned.

BACKGROUND OF THE INVENTION

1. Field of the Invention

The present invention relates to a pointing apparatus for performing pointing for an object in a three-dimensional space.

2. Description of the Related Art

Recently, the technology of computer graphics which forms figures on a display by using computer processing is used in a variety of fields.

In this computer graphics technology, a user gives a predetermined indication by performing pointing for an object displayed on a monitor display by using a pointing apparatus such as a mouse.

If the object is located in a three-dimensional space displayed on the monitor display, it is difficult to seize the depth of the three-dimensional space. The pointing for the object performed by the use of the pointing apparatus, therefore, is performed by informing a user of whether an area (indicating area) indicated by the user is in agreement with the position coordinate area of the object.

Information of pointing is conventionally performed by a method of giving a user an information indicating that a corresponding operation is executed or has been executed, by displaying an additional line in an indicating area pointed by a cursor or the like, or a method of performing feedback of voice information or information of the sense of touch for a user when an indicating area pointed by a cursor or the like is in agreement with the position coordinate area of an object.

In the above method of performing pointing by displaying an additional line or by performing feedback of the voice information or the information of the sense of touch for a user, however, variations occur in a manner in which a user recognizes the information. Therefore, variations readily occur in the accuracy with which pointing is performed for an object. In addition, a display on a monitor display becomes cumbersome. Also, the method requires means for performing feedback of the voice information or the information of the sense of touch for a user in addition to means for displaying data on a monitor display. Conventional pointing apparatuses, therefore, are complicated in arrangement and expensive. In addition, in using conventional pointing apparatuses, a user performs pointing while checking the voice information or the information of the sense of touch given independently of data on a display. Consequently, the user cannot concentrate on the display contents, and this may lead to a decrease in efficiency of a work for forming figures or the like.

SUMMARY OF THE INVENTION

It is an object of the present invention to provide a pointing apparatus which can improve the accuracy with which an object is pointed, which is simple in arrangement and inexpensive, and which can also contribute to an improvement in work efficiency.

The present invention is characterized by comprising input means for inputting an indicating area in a three-dimensional space, coordinates memory means for storing representative coordinates of an object in the three-dimensional space, distance determining means for determining a distance between the input indicating area from said input means and the object on the basis of coordinates of the indicating area and the representative coordinates of the object, color designating means for designating at least one of a predetermined color and a predetermined brightness as a color of at least one of the indicating area and the object in accordance with the distance determined by said distance determining means, and display means for displaying at least one of the indicating region and the object, the color of which is designated by said color designating means, in a predetermined color. More specifically, the present invention is characterized by comprising input means for inputting an indicating area in a three-dimensional space, coordinates memory means for storing representative coordinates of an object in the three-dimensional space, distance determining means for determining a distance between the input indicating area from said input means and the object on the basis of coordinates of the indicating area and the representative coordinates of the object, color designating means for designating a color of at least one of the indicating area and the object while continuously changing the color of at least one of the indicating area and the object in accordance with the distance determined by said distance determining means, and display means for displaying at least one of the indicating region and the object, the color of which is designated by said color designating means, in a predetermined color. The present invention is characterized by comprising input means for inputting an indicating area in a three-dimensional space, coordinates memory means for storing representative coordinates of an object in the three-dimensional space, distance determining means for determining a distance between the input indicating area from said input means and the object on the basis of coordinates of the indicating area and the representative coordinates of the object, color designating means for designating a color of at least one of the indicating area and the object when the distance determined by said distance determining means falls within a predetermined distance, and display means for displaying at least one of the indicating region and the object, the color of which is designated by said color designating means, in a predetermined color.

According to the present invention, when an indicating area is entered from the input means with respect to an object in a three-dimensional space, a predetermined color is designated as the color of at least one of the indicating area and the object in accordance with the distance between the object and the indicating area. More specifically, the color of at least one of the indicating area and the object is changed in accordance with the distance between the object and the indicating area.

The use of the above means makes it possible to visually check whether the indicating area of a user approaches an area where the object can be pointed or whether the object is in the area where pointing is possible. Therefore, no variations are caused in pointing for an object on the user side, and so the pointing accuracy can be stably improved. In addition, since a user can perform pointing on the screen of the display means, the apparatus is simple in arrangement and inexpensive compared to conventional apparatuses that require the means for performing feedback of pointing information for a user in addition to the means for displaying data on a screen. Furthermore, a user can concentrate on the display contents on a screen, so the apparatus can also contribute to an improvement in efficiency of a work for forming figures or the like.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a view for explaining an object coordinates memory unit of the first embodiment;

FIG. 3 is a view for explaining a display color memory unit of the first embodiment;

FIG. 4 is a view for explaining an object color memory unit of the first embodiment;

FIG. 5 is a view for explaining an object shape memory unit of the first embodiment;

FIG. 6 is a flow chart for explaining the operation of the first embodiment;

DETAILED DESCRIPTION OF THE PREFERRED EMBODIMENTS

The first embodiment of the present invention will be described below with reference to the accompanying drawings.

Figure 1:
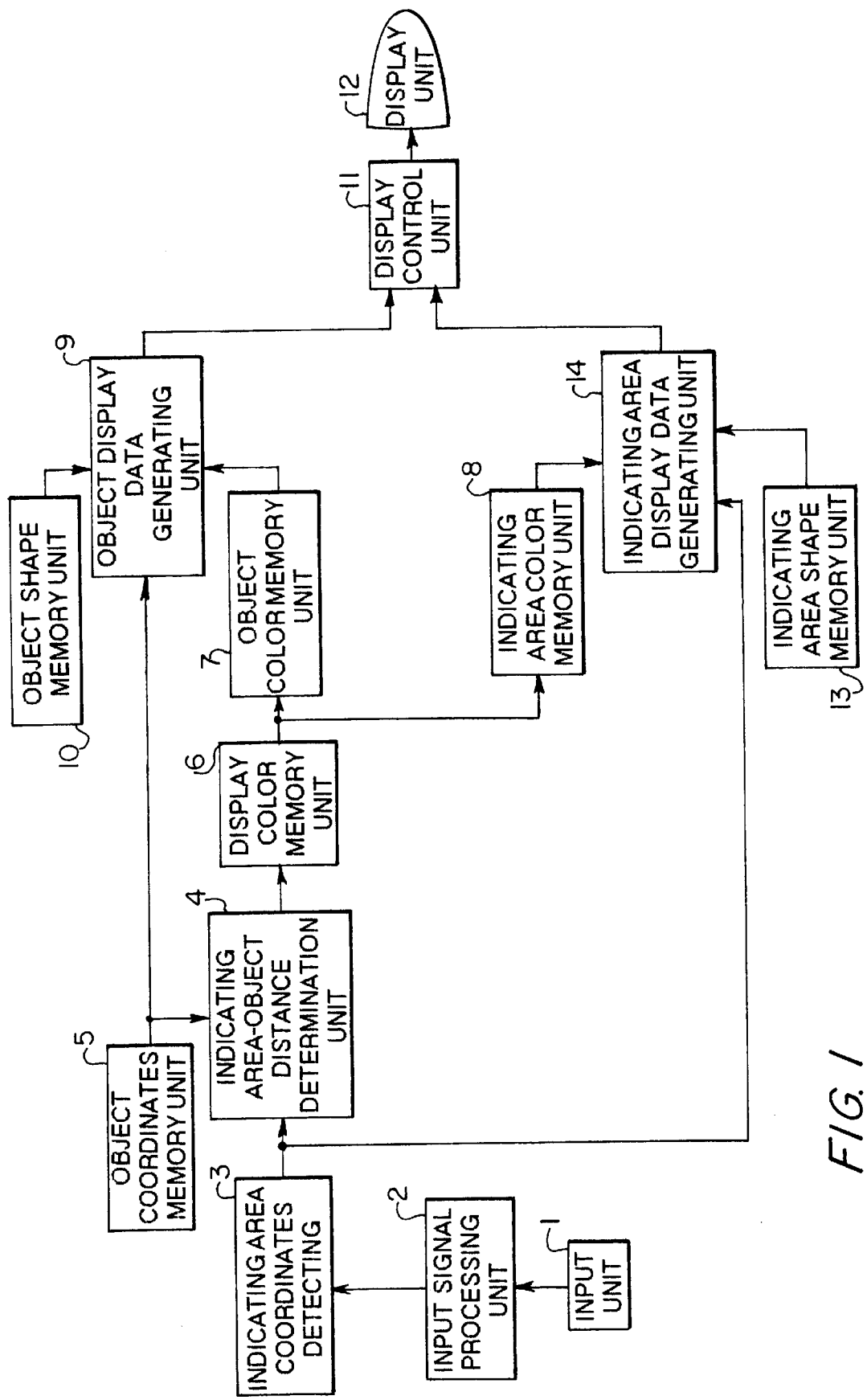
FIG. 1 is a block diagram showing the arrangement of the first embodiment of the present invention.

FIG. 1 is a block diagram showing the arrangement of a pointing apparatus according to the first embodiment of the present invention.

Referring to FIG. 1, an input unit 1, such as a mouse or a keyboard, inputs coordinates in a three-dimensional space displayed on a display unit 12 (to be described later), as an indicating area of a user.

The input signal from the input unit 1 is supplied to an input signal processing unit 2. The input signal processing unit 2 processes the input signal applied from the input unit 1.

The input signal processed by the input signal processing unit 2 is supplied to an indicating area coordinates detecting unit 3. The indicating area coordinates detecting unit 3 detects three-dimensional coordinates as the indicating area of a user from the input signal applied from the input signal processing unit 2.

The three-dimensional coordinate data detected by the indicating area coordinates detecting unit 3 is supplied to an indicating area-object distance determination unit 4. The indicating area-object distance determination unit 4 is also applied with an output from an object coordinates memory unit 5.

The object coordinates memory unit 5 stores the representative coordinates of each object defined in the three-dimensional space displayed on the display unit 12. The contents stored in the object coordinates memory unit 5 consist of, for example, representative coordinates (Xa,Ya,Za) of an object A, representative coordinates (Xb,Yb,Zb) of an object B, representative coordinates (Xc,Yc,Zc) of an object C, . . . , as shown in FIG. 2. In the examples shown in FIG. 2, the coordinates of the barycentric position of each object are used as the representative coordinates of that object. The indicating area-object distance determination unit 4 determines the distance between the indicating area and the object in the three-dimensional space. More specifically, the indicating area-object distance determination unit 4 determines a distance D between the indicating area and the object by making reference to the three-dimensional coordinate data of the indicating area and the representative coordinates of the object.

Figure 15A:
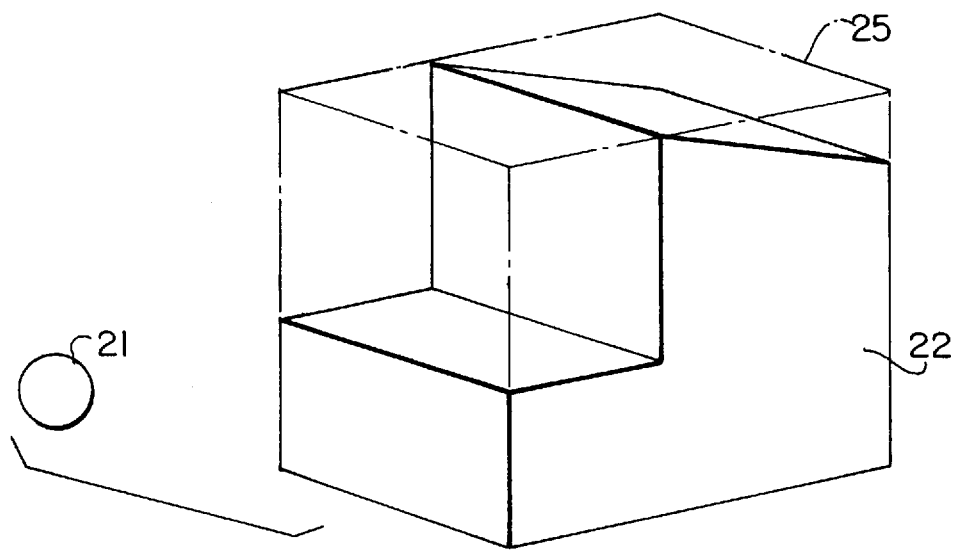
FIGS. 15A and 15B illustrate bounding boxes for expressing the position of an object.
Figure 15B:
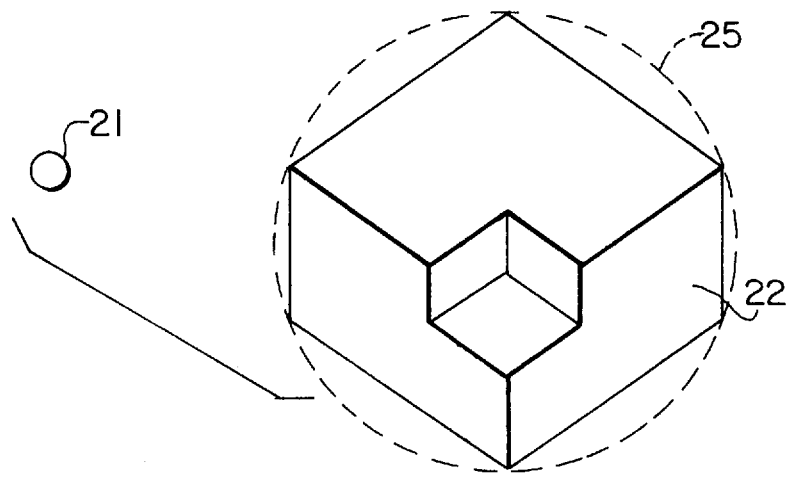

The position of the object may be expressed by a number of coordinates of a bounding box, not by representative coordinates. FIGS. 15A and 15B show examples of a manner in which the three-dimensional position of the object is expressed. In FIGS. 15A and 15B, bounding boxes are indicated by the broken lines.

Referring to FIG. 15A, the bounding box 25 is a rectangular parallelepiped and surrounds the object. The three-dimensional position of the bounding box is expressed by a number of coordinates which represent the boundaries (or a relative position). The coordinates of the bounding box are specifically those of the center of the rectangular parallelepiped and those of the vertex positions thereof.

As shown in FIG. 15B, the bounding box 25 may be in the form of a sphere. In the case of a spherical bounding box 25, its position and size are determined by the coordinates of the center of the sphere and the coordinates of the radius of the sphere. The relationships between the indicating area 21 and the object 22 are expressed on the basis of either the state in which the object is pointed or the distance between the indicating area 21 and the object 22, since the indicating area 21 and the planes of the bounding box 25 may interfere with each other.

The distance D determined by the indicating area-object distance determination unit 4 is output to a display color memory unit 6. The display color memory unit 6 stores the relationship between the distance D and a color parameter S, for example, as shown in FIG. 3. The color parameter S corresponding to the distance D is read out from the display color memory unit 6.

The color parameter S read out from the display color memory unit 6 is supplied to an object color memory unit 7 and an indicating area color memory unit 8.

The object color memory unit 7 stores the attributes of a color, i.e., a hue H, a value V, and a saturation S, as numeric values, for each of the objects A, B, C, . . . , for example, as shown in FIG. 4. The object color memory unit 7 also rewrites the value of the saturation (vividness of color) S in accordance with the color parameter S read out from the display color memory unit 6. Like the object color memory unit 7 described above, the indicating area color memory unit 8 stores the attributes of a color, i.e., the hue H, the value V, and the saturation S, as numeric values, for the indicating area. In addition, similar to the object color memory unit 7, the indicating area color memory unit 8 rewrites the value of the saturation S according to the color parameter S read out from the display color memory unit 6.

Object color data read out from the object color memory unit 7, together with object shape data read out from an object shape memory unit 10 and object coordinate data read out from the object coordinate memory unit 5, is applied to an object display data generating unit 9.

The object shape memory unit 10 stores data concerning the shapes of the objects A, B, C, . . . , for example, as shown in FIG. 5.

The object display data generating unit 9 generates object display data on the basis of the object shape data, the object coordinate data, and the object color data. The object display data generated by the object display data generating unit 9 is displayed in the three-dimensional space on the display unit 12 by a display control unit 11.

Indicating area color data read out from the indicating area color memory unit 8, together with indicating area shape data read out from an indicating area shape memory unit 13 and indicating area coordinate data read out from the indicating area coordinates memory unit 3, is applied to an indicating area display data generating unit 14.

The indicating area display data generating unit 14 generates indicating area display data on the basis of the indicating area shape data, the indicating area coordinate data, and the indicating area color data. The indicating area display data generated by the indicating area display data generating unit 14 is displayed in the three-dimensional space on the display unit 12 by the display control unit 11.

The operation of the first embodiment with the above arrangement will be described below.

Figure 7:
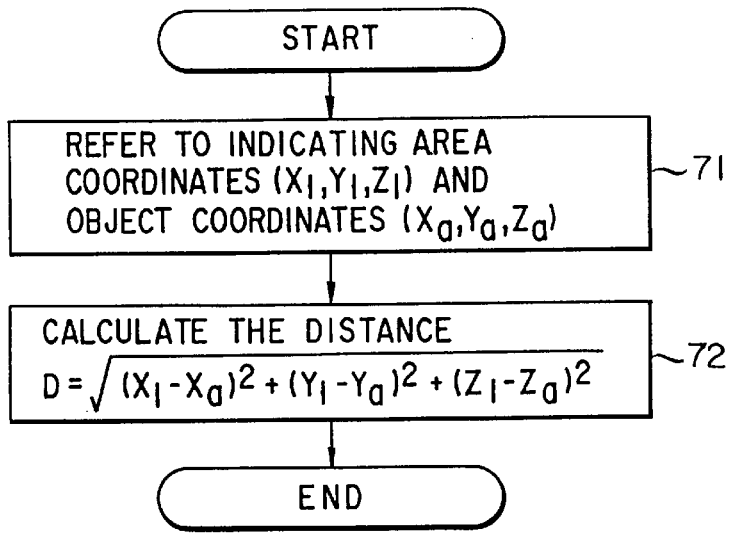
FIG. 7 is a flow chart for explaining the operation of the first embodiment.

A procedure of changing the color of an object step by step in accordance with the distance between an indicating area and the object will be described with reference to the flow charts shown in FIGS. 6 and 7.

When an indicating area of a user is input from the input unit 1, this input signal is transferred to the indicating area coordinates detecting unit 3 via the input signal processing unit 2, and the indicating area coordinates detecting unit 3 detects three-dimensional coordinate data of the indicating area.

The indicating area-object distance determination unit 4 refers to the three-dimensional coordinates of the indicating area and the representative coordinates of an object defined in a three-dimensional space, which are stored in the object coordinates memory unit 5, and determines the distance D between the three-dimensional coordinates of the indicating area and the representative coordinates of the object (step 61). A method of calculating the distance D in step 61 will be described below with reference to FIG. 7. Assume that (X1,Y1,Z1) are given as the three-dimensional coordinates of the indicating area, and (Xa,Ya,Za), as the representative coordinates of the object A shown in FIG. 2, are given as the representative coordinates of the object. In this case, the indicating area-object distance determination unit 4 refers to these coordinates (step 71), and calculates the distance D between the three-dimensional coordinates of the indicating area and the representative coordinates of the object by using an equation shown in step 72.

The distance D determined by the indicating area-object distance determination unit 4 is supplied to the display color memory unit 6. The display color memory unit 6 reads out the color parameter S corresponding to the distance D. If the distance D is within the range of 11 to 30 as shown in FIG. 3, "0.8" is determined as the color parameter S, and this color parameter S is read out (step 62).

Upon receiving the color parameter S read out from the display color memory unit 6, the object color memory unit 7 rewrites the numeric value of the saturation S, one of the color attributes, i.e., the hue H, the value v, and the saturation S, stored for the object A shown in FIG. 4, with the color parameter S (=0.8).

The output object color data from the object color memory unit 7, together with object shape data from the object shape memory unit 10 and object coordinate data from the object coordinates memory unit 5, is applied to the object display data generating unit 9.

The object display data generating unit 9 generates object display data on the basis of the object shape data, the object coordinate data, and the object color data. This object display data is displayed on the display unit 12 by the display control unit 11 (step 63).

The object display data displayed on the display unit 12 is given in a color with a saturation consistent with the color parameter S (=0.8) which corresponds to the distance D between the indicating area and the object.

In the same manner as described above, an indicating area of the user is again input from the input unit 1, and the indicating area-object distance determination unit 4 determines the distance D between the indicating area of the user and the representative coordinates of the object A. If the distance D is within the range of 0 to 10 shown in FIG. 3, "1" is determined as the color parameter S.

Upon receiving the color parameter S, the object color memory unit 7 rewrites the saturation S, i.e., one of the color attributes stored for the object A as shown in FIG. 4, with the color parameter S (=1), and sends the saturation S, together with the object shape data and the object coordinate data, to the object display data generating unit 9. The object display data generating unit 9 generates object display data corresponding to the color parameter S (=1), and this object display data is displayed on the display unit 12 by the display control unit 11.

Figures 8A, 8B, 8C:
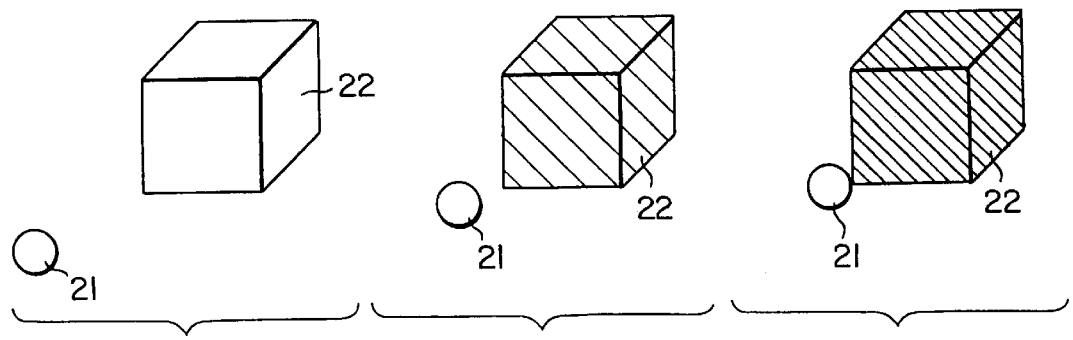
FIGS. 8A to 8C are views showing an example of display when the color of an object is changed step by step in the first embodiment.

With the above operation, the display unit 12 can display, as shown in FIGS. 8A, 8B, and 8C, the color of an object 22 while changing it step by step in accordance with the distance D between an indicating area 21 of a user and the representative coordinates of the object 22. If it is predetermined that the saturation S of the color of the object 22 becomes 1 when the object 22 is pointed, the object 22 can be pointed at the time the saturation S of the color of the object 22 displayed on the display unit 12 becomes 1 (i.e., in the condition shown in FIG. 8C).

In the above embodiment, the color of an object is changed step by step in accordance with the distance between an indicating area and the object. However, the color of the indicating area can also be changed step by step in accordance with the distance between the indicating area and the object.

In this case, in FIG. 1, the distance D between an indicating area of a user and an object, that is determined by the indicating area-object distance determination unit 4, is supplied to the display color memory unit 6. The display color memory unit 6 reads out the color parameter S corresponding to the distance D, and, in the same manner as described above with reference to FIG. 4, the indicating area color memory unit 8 rewrites the numeric value of the saturation S, i.e., one of the color attributes stored for that object, with the readout color parameter S. The indicating area color data thus obtained, together with indicating area shape data from the indicating area shape memory unit 13 and coordinate data from the indicating area coordinates memory 3, is applied to the indicating area display data generating unit 14. The indicating area display data generating unit 14 generates indicating area display data, and this indicating area display data is displayed on the display unit 12 by the display control unit 11.

Figures 9A, 9B, 9C:
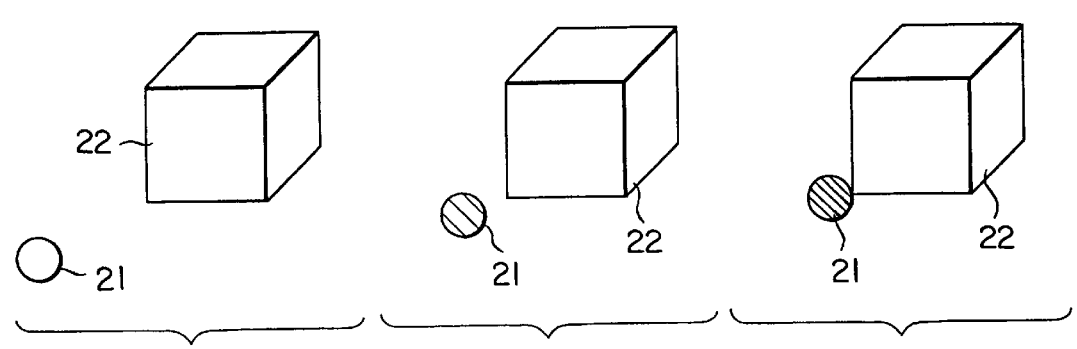
FIGS. 9A to 9C are views showing an example of display when the color of an indicating area is changed step by step in the first embodiment.

In this embodiment, as shown in FIGS. 9A, 9B, and 9C, the color of an indicating area 21 of a user can be displayed on the display unit 12 while being changed step by step in accordance with the distance D between the indicating area 21 and the representative coordinates of an object 22. Also in this case, like in the above example, if it is predetermined that the saturation S of the color of the indicating area 21 becomes 1 when the object 22 is pointed, the object 22 can be pointed at the time the saturation S of the color of the indicating area 21 displayed on the display unit 12 becomes 1 (i.e., in the condition shown in FIG. 9C).

In the above embodiment, the color of either an indicating area or an object is changed in accordance with the distance between the indicating area and the object. However, the colors of both the object and the indicating area can also be changed step by step in accordance with the distance between the indicating area and the object.

Referring to FIG. 1, the distance D between an indicating area and an object, determined by the indicating area-object distance determination unit 4, is supplied to the display color memory unit 6. The display color memory unit 6 reads out the color parameter S corresponding to the distance D. The object color memory unit 7 rewrites the numerical value of the saturation S, i.e., one of the color attributes stored for that object, with the readout color parameter S, and applies the consequent object color data, together with object shape data and object coordinate data, to the object display data generating unit 9. In addition, the indicating area color memory unit 8 applies indicating area color data, together with indicating area shape data and indicating area coordinate data, to the indicating area display data generating unit 14.

Object display data and indicating area display data are generated in this manner and displayed on the display unit 12 by the display control unit 11.

Figures 10A, 10B, 10C:
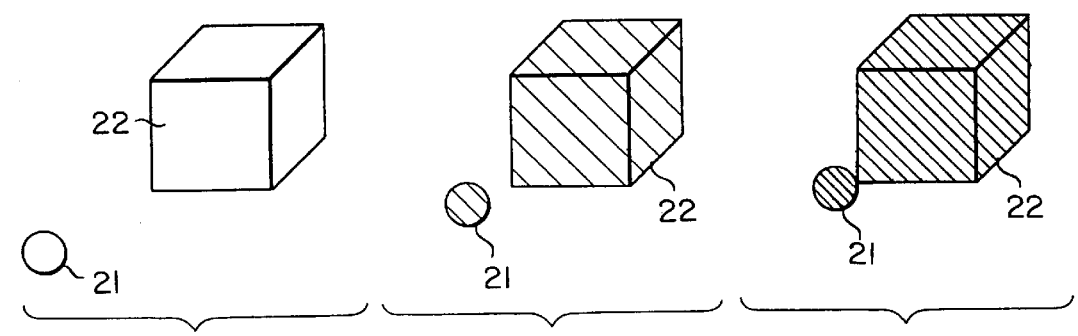
FIGS. 10A to 10C are views showing an example of display when the colors of both an object and an indicating area are changed step by step in the first embodiment.

As shown in FIGS. 10A, 10B, and 10C, the colors of both an object 22 and an indicating area 21 of a user can be displayed on the display unit 12 while being changed step by step in accordance with the distance D between the indicating area 21 and the representative coordinates of the object 22. If it is predetermined that the saturation S of the color of each of the indicating area 21 and the object 22 becomes 1 when the object 22 is pointed, the object 22 can be pointed at the time the saturation S of the color of each of the indicating area 21 and the object 22 displayed on the display unit 12 becomes 1 (i.e., in the condition shown in FIG. 10C).

In the above first embodiment, the color of at least one of an object and an indicating area of a user is changed step by step in accordance with the distance D between the indicating area and the representative coordinates of the object. It is, however, also possible to change the color of one of the object and the indicating area when the indicating area enters an area in which the object can be pointed. The second embodiment of the present invention with this arrangement will be described below with reference to FIGS. 11 to 14C. The arrangement of an apparatus of this second embodiment is the same as that of the first embodiment described above, and so an illustration and a detailed description thereof will be omitted.

Figure 11:
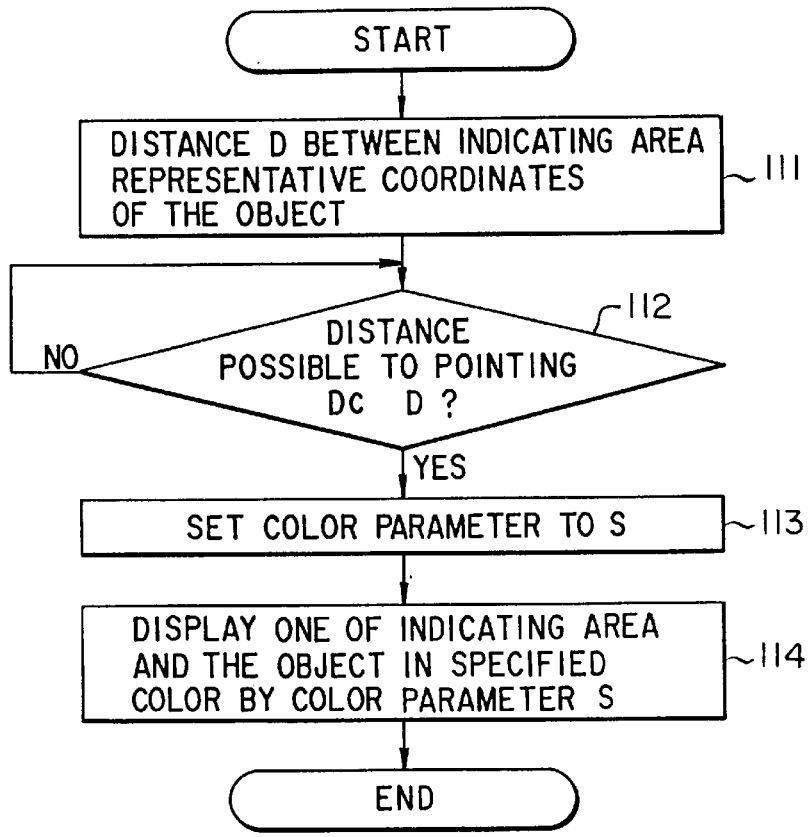
FIG. 11 is a flow chart for explaining the operation of the second embodiment of the present invention.

Referring to FIG. 11, when an indicating area-object distance determination unit 4 determines a distance D between an indicating area of a user and an object (step 111), whether the distance D is within a distance Dc possible to pointing (step 112). If YES is determined in step 112, a saturation S of the color attributes of at least one of the indicating area and the object is forced to be set to a predetermined color parameter S (e.g., S=1) (step 113). At least one of the object and the indicating area is displayed by using this color parameter S (=1) (step 114).

Figures 12A, 12B, 12C:
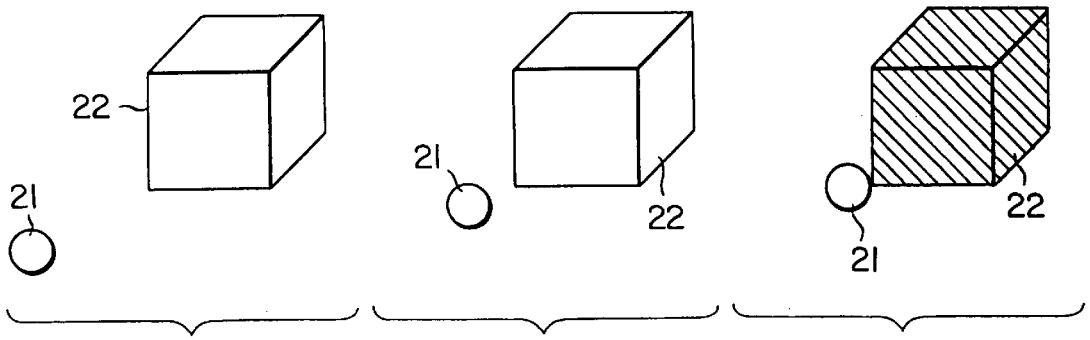
FIGS. 12A to 12C are views showing an example of display when the color of an object is changed step by step in the second embodiment.
Figures 13A, 13B, 13C:
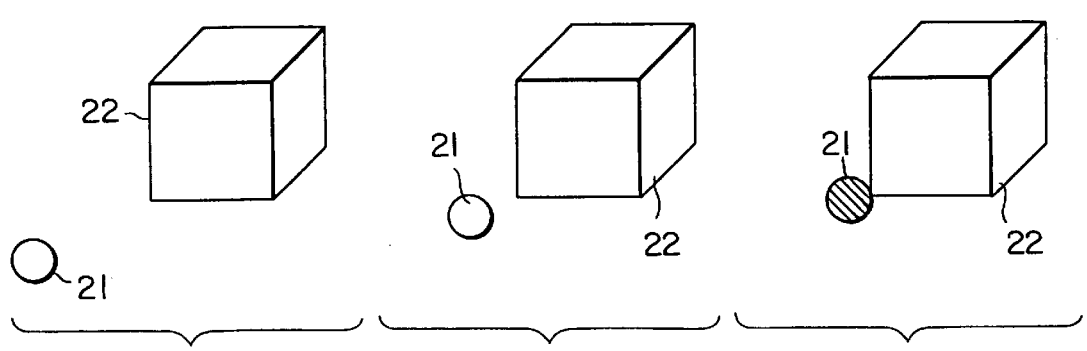
FIGS. 13A to 13C are views showing an example of display when the color of an indicating area is changed step by step in the second embodiment.
Figures 14A, 14B, 14C:
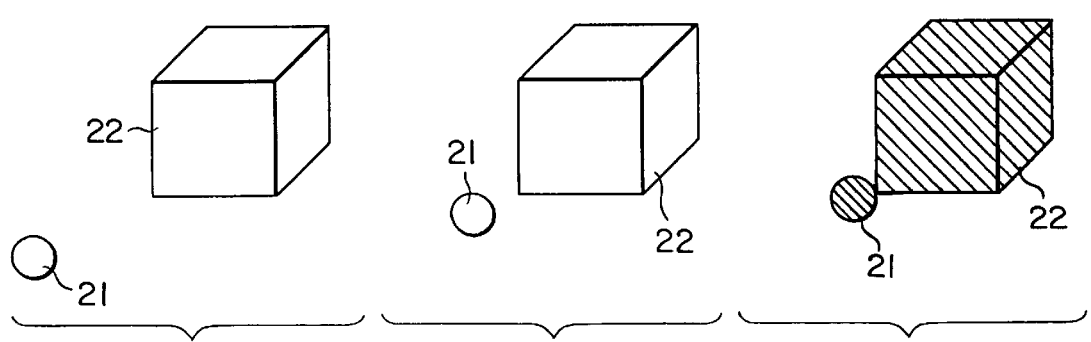
FIGS. 14A to 14C are views showing an example of display when the colors of both an object and an indicating area are changed step by step in the second embodiment.

In this second embodiment, an example of display when the color of an object is to be changed can be expressed as shown in FIGS. 12A, 12B, and 12C. Referring to FIGS. 12A to 12C, an object 22 can be pointed at the time the saturation S of the color of the object 22 becomes 1 (i.e., in the condition shown in FIG. 12C). An example of display obtained when the color of an indicating area of a user is to be changed can be expressed as shown in FIGS. 13A, 13B, and 13C. Referring to FIGS. 13A to 13C, the object 22 can be pointed at the time the saturation S of the color of an indicating area 21 becomes 1 (i.e., in the condition shown in FIG. 13C). An example of display obtained when the colors of both an object and an indicating area are to be changed can be expressed as shown in FIGS. 14A, 14B, and 14C. Referring to FIGS. 14A to 14C, the object 22 can be pointed at the time the saturations S of the colors of both the object 22 and the indicating area 21 become 1 (i.e., in the condition shown in FIG. 14C).

The present invention is not limited to the above embodiments but can be modified and carried out without departing from the spirit and scope of the invention.

As an example, HSV method is employed as a method of designating the color and a color parameter to be changed is a saturation in each of the above embodiments, but another color parameter, such as a value of color, may be changed. In addition, although a saturation, a value of color, and a hue have been described as color parameters, RGB method is employed as a method of designating the color and each value of R (red), G (green), and B (blue) can also be changed.

In each of the above embodiments, the distance relationship between an indicating area and an object is represented by the change in color. However, the brightness of a color can also be changed in order to represent the distance relationship between the indicating area and the object.

Furthermore, the distance D between an indicating area of a user and the representative coordinates of an object is used in each of the above embodiments, but a color parameter may also be changed in accordance with the volume of a portion in which a certain set area and an indicating area cross each other.

Additional advantages and modifications will readily occur to those skilled in the art. The changing of the color or brightness is not the only way for representing the distance between the indicating area and the object.

That is, the distance between the indicating area and the object may be represented by causing at least one of the indicating area and the object to blink. In this case, the blinking speed may be increased when the indicating area and the object become closer to each other.

In addition, the form of at least one of the object and the indicating area may be changed in the predetermined period. For example, the size of at least one of them may be changed in the predetermined period. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A pointing apparatus comprising:

input means for inputting an indicating area in a three-dimensional space;

coordinate storing means for storing representative coordinates of a three-dimensional object in the three-dimensional space;

determining means for determining a three-dimensional bounding box surrounding said three-dimensional object;

distance determining means for determining a distance between the input indicating area from said input means and a surface of the three-dimensional bounding box;

a memory for storing data which relates distance and at least one display form attribute, wherein display form attributes output from said memory are varied, when said input indicating area is outside said bounding box, in accordance with varying distances determined by said distance determining means; and display means for displaying at least the three-dimensional object in accordance with the display form attributes output from said memory.

2. An apparatus according to claim 1, wherein said display designating means includes means for changing blinking speed of at least one of the object and the indicating area with a predetermined period.

3. An apparatus according to claim 1, further comprising:

object shape memory means for storing a shape of the object; and indicating area memory means for storing a shape of the indicating area.

4. A pointing apparatus comprising:

input means for inputting an indicating area in a three-dimensional space;

coordinate storing means for storing representative coordinates of a three-dimensional object in the three-dimensional space;

determining means for determining a three-dimensional bounding box surrounding said three-dimensional object;

distance determining means for determining a distance between the input indicating area from said input means and a surface of the three-dimensional bounding box;

a memory for storing data which relates distance and at least one display form attribute, wherein display form attributes output from said memory are varied in accordance with varying distances determined by said distance determining means; and display means for displaying at least the three-dimensional object in accordance with the display form attributes output from said memory, and wherein said memory includes means for changing a size of at least one of the object and the indicating area with a predetermined period.

5. A pointing apparatus comprising:

input means for inputting an indicating area in a three-dimensional space;

coordinate storing means for storing representative coordinates of a three-dimensional object in the three-dimensional space;

determining means for determining a three-dimensional bounding box surrounding said three-dimensional object;

distance determining means for determining a distance between the input indicating area from said input means and a surface of the three-dimensional bounding box;

a memory for storing data which relates distance and at least one display form attribute, wherein display form attributes output from said memory are varied in accordance with varying distances determined by said distance determining means;

display means for displaying at least the three-dimensional object in accordance with the display form attributes output from said memory;

object shape memory means for storing a shape of the object; and indicating area memory means for storing a shape of the indicating area, wherein said distance determining means includes means for calculating a volume of a region in which the indicating area and the object cross each other and said memory includes means for designating a predetermined color as the color of one of the indicating area and the bounding box in accordance with the volume of the cross portion.

6. A pointing system, comprising:

inputting unit for inputting signals representing indicating area position coordinates of an indicating area displayed on a display screen;

an object coordinates storing unit for storing object position coordinates of an object displayed on said display screen;

a distance determining unit for determining distances between said indicating area and said object based on the indicating area position coordinates and the object position coordinates;

an object color attribute storing unit for storing color attributes of said object;

an indicating area color attribute storing unit for storing color attributes of said indicating area;

a display storing unit for storing a relationship between distance and at least one color attribute, and for supplying color attributes to said object color attribute storing unit and said indicating area color attribute storing unit in accordance with the distances determined by said distance determining unit, said display storing unit dynamically varying said color attributes supplied to said object color attribute storing unit and said indicating area color attribute storing unit in accordance with varying distances determined by said distance determining unit;

display data generating units for generating display data based on the color attributes of said object and the color attributes of said indicating area; and a display control unit for controlling said display screen to display said object and said indicating area in accordance with the generated display data.

7. The pointing system according to claim 6, wherein said display color storing unit includes a table for storing a plurality of distance ranges and a value of said at least one color attribute corresponding to each distance range.

8. A pointing apparatus comprising:

input means for inputting an indicating area in a three-dimensional space;

coordinate storing means for storing representative coordinates of a three-dimensional object in the three-dimensional space;

determining means for determining a three-dimensional bounding box surrounding said three-dimensional object;

distance determining means for determining a distance between the input indicating area from said input means and a surface of the three-dimensional bounding box;

a memory for storing data which relates distance and blinking speed attributes, wherein blinking speed attributes output from said memory are dynamically varied, when said input indicating area is outside said bounding box, in accordance with varying distances determined by said distance determining means; and display means for displaying at least the three-dimensional object in accordance with the blinking speed attributes output from said memory.

9. A pointing apparatus comprising:

input means for inputting an indicating area in a three-dimensional space;

coordinate storing means for storing representative coordinates of a three-dimensional object in the three-dimensional space;

determining means for determining a three-dimensional bounding box surrounding said three-dimensional object;

distance determining means for determining a distance between the input indicating area from said input means and a surface of the three-dimensional bounding box;

a memory for storing data which relates distance and brightness attributes, wherein brightness attributes output from said memory are dynamically varied, when said input indicating area is outside said bounding box, in accordance with varying distances determined by said distance determining means; and display means for displaying at least the three-dimensional object in accordance with the brightness attributes output from said memory.

* * * * *